US009458762B2

(12) United States Patent
Goloubev

(10) Patent No.: US 9,458,762 B2
(45) Date of Patent: Oct. 4, 2016

(54) METHOD AND DEVICE FOR GENERATING ELECTRICAL ENERGY

(71) Applicant: Linde Aktiengesellschaft, Munich (DE)

(72) Inventor: Dimitri Goloubev, Munich (DE)

(73) Assignee: Linde Aktiengesellschaft, Munich (DE)

( * ) Notice: Subject to any disclaimer, the term of this patent is extended or adjusted under 35 U.S.C. 154(b) by 620 days.

(21) Appl. No.: 13/856,115

(22) Filed: Apr. 3, 2013

(65) Prior Publication Data

US 2014/0033732 A1 Feb. 6, 2014

(30) Foreign Application Priority Data

Apr. 3, 2012 (DE) .................. 10 2012 006 746

(51) Int. Cl.
*F02C 3/00* (2006.01)
*F25J 3/04* (2006.01)

(52) U.S. Cl.
CPC .............. *F02C 3/00* (2013.01); *F25J 3/0406* (2013.01); *F25J 3/04018* (2013.01);
(Continued)

(58) Field of Classification Search
CPC .............. F02C 3/00; F02C 6/14; F02C 6/16; F25J 1/0228; F25J 3/04018; F25J 3/0406; F25J 3/04224; F25J 3/04254; F25J 3/04303; F25J 3/04309; F25J 3/04363; F25J 3/04393; F25J 3/04496; F25J 3/04509; F25J 3/04533; F25J 3/04545; F25J 3/04581; F25J 3/04618; F25J 3/04836; F25J 2230/06; F25J 2240/70; F25J 2245/50; F25J 2210/50; F25J 2230/04; F25J 2210/06
See application file for complete search history.

(56) References Cited

U.S. PATENT DOCUMENTS 5,084,081 A 1/1992 Rohde
5,953,937 A 9/1999 Corduan et al.
(Continued)

FOREIGN PATENT DOCUMENTS

DE   10 2011 113 671   3/2013
EP        1 043 557   10/2000
(Continued)

OTHER PUBLICATIONS

Rohde, W. et al., "Variable Oxygen-Supply System," Linde Reports on Science and Technology, 1984, pp. 18-20.
(Continued)

*Primary Examiner* — Arun Goyal
(74) *Attorney, Agent, or Firm* — Millen White Zelano & Branigan, PC; Brion Heaney; Anthony Zelano

(57) ABSTRACT

The method and the apparatus described are used for generating electrical energy in a combined system comprising a power plant and a low-temperature air separation unit. A feed air stream is compressed in a main air compressor, cooled, and introduced into a distillation column system having a high-pressure column and a low-pressure column. A first oxygen-enriched stream from the distillation column system is introduced into the power plant. In a first operating mode, cryogenic liquid from the distillation column system is introduced into a liquid tank and is stored there at least in part. In a second operating mode, stored cryogenic liquid is removed from the liquid tank and introduced into the distillation column system. A second process fluid from the distillation column system is heated and then actively depressurized in a hot expansion turbine. In addition, in the second operating mode, a nitrogen-enriched product stream from the high-pressure column is also heated to a high temperature and then depressurized in the hot expansion turbine.

26 Claims, 9 Drawing Sheets

(52) U.S. Cl.
CPC ....... *F25J 3/04181* (2013.01); *F25J 3/04224* (2013.01); *F25J 3/04254* (2013.01); *F25J 3/04303* (2013.01); *F25J 3/04309* (2013.01); *F25J 3/04363* (2013.01); *F25J 3/04393* (2013.01); *F25J 3/04496* (2013.01); *F25J 3/04509* (2013.01); *F25J 3/04533* (2013.01); *F25J 3/04545* (2013.01); *F25J 3/04581* (2013.01); *F25J 3/04618* (2013.01); *F25J 3/04836* (2013.01); *F25J 2210/06* (2013.01); *F25J 2210/50* (2013.01); *F25J 2230/04* (2013.01); *F25J 2230/06* (2013.01); *F25J 2240/70* (2013.01); *F25J 2245/50* (2013.01); *Y02E 20/16* (2013.01)

(56) References Cited

U.S. PATENT DOCUMENTS

| | | | |
|---|---|---|---|
| 6,134,916 | A | 10/2000 | Jahnke |
| 6,295,838 | B1 | 10/2001 | Shah et al. |
| 6,508,053 | B1 | 1/2003 | Ha et al. |
| 7,228,715 | B2 | 6/2007 | Brugerolle et al. |
| 2005/0132746 | A1 | 6/2005 | Brugerolle et al. |
| 2007/0130992 | A1 | 6/2007 | Brugerolle et al. |
| 2007/0251267 | A1* | 11/2007 | Ha .................... F25J 3/0406 62/615 |
| 2011/0023540 | A1 | 2/2011 | Alekseev |
| 2012/0216520 | A1* | 8/2012 | Chen ....................... F03G 7/06 60/412 |

FOREIGN PATENT DOCUMENTS

| | | |
|---|---|---|
| FR | 2 956 478 | 8/2011 |
| JP | 11 063811 | 3/1999 |
| WO | WO-2005 064252 | 7/2005 |
| WO | WO-2009 095188 | 8/2006 |

OTHER PUBLICATIONS

European Search Report for EP12002946 dated Sep. 28, 2012.
Nippon Oxygen Co Ltd., "Method and device for manufacturing low impurity oxygen," Espacenet, Publication Date: Mar. 5, 1999; English Abstract of JP-11 063811.
Linde AG, "Verfahren and Vorrichtung zur Tieftemperaturzerlegung von Luft," Espacenet, Publication Date: Mar. 21, 2013; English Abstract of DE-10-2011 113 671.

* cited by examiner

METHOD AND DEVICE FOR GENERATING ELECTRICAL ENERGY

SUMMARY OF THE INVENTION

The invention relates to a method and a device for generating electrical energy, in which oxygen is consumed in the power plant, for example, for combustion of a fuel (oxyfuel power plant) or for generating a fuel by partial oxidation (for example, carbon or heavy oil gasification in an IGCC (Integrated Gasification Combined-Cycle) power plant).

In particular, the invention relates to a method for generating electrical energy in a combined system that comprises a power plant and a low-temperature air separation unit. In the low-temperature air separation unit, a compressed feed air stream is cooled in a main heat exchanger, and introduced into a distillation column system comprising a high-pressure column and a low-pressure column. A first oxygen-enriched product stream is removed from the distillation column system and introduced into the power plant. According to a first operating mode, a cryogenic liquid, formed by a first process fluid of the distillation column system, is introduced into a liquid tank and is stored there at least in part. In a second operating mode, stored cryogenic liquid is removed from the liquid tank and introduced into the distillation column system. A second process fluid from the distillation column system is heated to a high temperature and then actively depressurized in a hot expansion turbine, and the mechanical energy generated in the hot expansion turbine is converted at least partially into electrical energy.

In this system, as mentioned, an oxygen-enriched product from the distillation column system is introduced into the power plant. This introduction can be performed directly or it can be performed indirectly, for example via a buffer in the form of a liquid tank or a gas pressure storage device.

Owing to the ever-increasing proportion of renewable energies being used in the generation of power, the demands of load flexibility for such power plants are steadily increasing. Economic efficiency, in particular of oxyfuel power plants, therefore depends particularly on the ability to adapt loads quickly and efficiently.

Influenced by specific seasonal fluctuations, the fluctuation range of the demand for electrical energy is determined essentially by the day-night cycle. If the power demand on the grid is low (nighttime), the power plant preferably generates as little energy as possible. Delivery into the grid can even be penalized in this case. If the power demand increases (daytime), the power plant preferably feeds into the grid again with full load and maximum efficiency.

The short-term shut-off of the power plant at night represents an operational problem. Therefore, the power plant is run down to minimum load. Since electrical energy is still being generated, this energy is typically artificially destroyed in order to avoid the penalty for feeding into the grid.

In the case of a low demand for electrical energy, for example during the night, the system can be run in a "first operating mode." In this case, a first process fluid in cryogenic liquid form from the distillation column system is introduced into a liquid tank and stored there. During this first operating mode, the liquid level in the tank thus rises, and energy is thus stored.

Here, a "process fluid of the distillation column system" is defined as a fluid that is removed either directly or indirectly from the distillation column system or is intended for introduction into the distillation column system. Such a process fluid can be formed, for example, by feed air, a nitrogen-enriched product, or an oxygen-enriched product of the low-temperature air separation unit.

Conversely, when there is a high demand for electrical energy, the system can be run in a "second operating mode," in which energy stored in the liquid tank is released. In this connection, liquid from the tank is introduced into the distillation column system and its coldness is used. At the same time, a second process fluid of the distillation column system is heated to a high temperature and then depressurized in a hot expansion turbine, and thus additional electrical energy is generated. During this second operating mode, the liquid level drops in the tank, and thus energy is released.

The "second process fluid" can have the same or different chemical composition as the "first process fluid."

Here, a "hot expansion turbine" is defined as an expansion turbine, upon whose entry into normal operation a high temperature prevails, and which is designed for the active depressurization stage of a stream, which is formed mainly or completely by process fluid from the distillation column system. Thus, in particular, turbines, which are operated mainly with a combustion gas, as is the case in the expansion of conventional gas turbine systems, are ruled out.

A "high temperature," which prevails at the inlet of the hot expansion turbine, is defined here as a temperature that lies above the ambient temperature, and in particular is at least 40° C., preferably at least 45° C.; for example, the "high temperature" is in the range of 45° C. to 145° C.

A method of the above-mentioned type and a corresponding device are known from WO 2005/064252 A1 (U.S. Pat. No. 7,228,715; US 2005/0132746; US 2007/0130992). Here, in the "first operating mode," liquid air is stored as cryogenic liquid, and the additional cold available in the "second operating mode" is used in a cold compressor, which pressurizes nitrogen from the low-pressure column of the distillation column system before this nitrogen stream is heated and routed to the expansion turbine.

Thus, an aspect of the invention is to provide an especially energy-advantageous system for energy storage in order to improve as much as possible the efficiency of the power plant during full-load periods.

Upon further study of the specification and appended claims, other aspects and advantages of the invention will become apparent.

These aspects are achieved by a system as described above in which in the second operating mode, a nitrogen-enriched product stream from the high-pressure column is used as a second process fluid of the distillation column system, heated to a high temperature and then depressurized in the hot expansion turbine.

In the method according to the invention, the elevated pressure in the high-pressure column that is already present in the distillation column system is used to generate the pressure drops required in the expansion turbine or at least a portion thereof. A cold compressor for the second process fluid of the distillation column system as in the known method is not necessary. Thus, on the one hand, the corresponding equipment cost is eliminated. Primarily, the method according to the invention can additionally generate considerably more energy per amount of liquid stored in the tank, since the energy-unfavorable heat input at a low temperature level is eliminated. Accordingly, in the case of the invention, generally no cold compressor is used to compress the second process fluid. In particular, even during the second operating mode, preferably no cold gas is removed from the low-temperature air separation unit; preferably, rather, the second process fluid is heated in the main heat exchanger of the low-temperature air separation unit, in particular up to approximately ambient temperature.

The invention makes possible an especially efficient energy management between an air separation unit and a power plant consuming oxygen, such as an oxyfuel-carbon power plant. A large portion of the liquefaction work that is to be expended in the first operating mode for the liquefaction of the first process fluid is recovered in the second operating mode in the hot expansion turbine. The efficiency of such an energy storage device is very high and can be, for example, 60 to 65%.

When the distillation column system of the low-temperature air separation unit has more than two separation columns for nitrogen-oxygen separation, the "high-pressure column," in terms of the invention, can be formed by any one of the separation columns that is not the low-pressure column, i.e., not the separation column for nitrogen-oxygen separation that operates at the lowest pressure. In the case of a three-column system, the "high-pressure column" can be formed by, for example, the separation column with the highest operating pressure or by the one with the second-highest operating pressure. Such a three-column system has two "high-pressure columns" in terms of the invention.

According to another configuration, the second process fluid is not compressed, but rather is introduced into the expansion turbine under the pressure of the high-pressure column (minus line losses).

In a special embodiment of the invention, in the first operating mode, a third process fluid of the distillation column system, which also is formed by a nitrogen-enriched product stream from the high-pressure column or a high-pressure column, is actively depressurized in a cold expansion turbine, and the actively depressurized third process fluid is heated in the main heat exchanger.

A "cold expansion turbine" is defined as an expander whose outlet temperature is considerably below than ambient temperature, in particular lower than 200 K. The inlet temperature of the cold expansion turbine also lies below the ambient temperature, in any case does not exceed it.

In the main heat exchanger, the cold generated in the cold expansion turbine is transferred to other process streams of the low-temperature air separation unit, for example, to feed air. The "main heat exchanger" is used to cool the feed air by indirect heat exchange with backflows (process streams) from the distillation column system. The main heat exchanger can be formed from one or more parallel- and/or serially-connected heat exchanger section(s), for example, from one or more plate heat exchanger block(s).

In the first operating mode (in the case of low demand for electrical energy), cold is thus generated in an energy-favorable way by active depressurization of a nitrogen stream from the high-pressure column, which is necessary for the operation of the low-temperature air separation unit and the liquefaction of the first process fluid. During the second operating mode (in the case of high demand for electrical energy), the throughput through the cold expansion turbine is reduced or the cold expansion turbine is completely turned off. The amount of nitrogen from the high-pressure column that is released in this case can then (in addition) be used in the hot expansion turbine for generating electrical energy.

It is especially advantageous when, in the first operating mode, a second oxygen-enriched product stream from the distillation column system, which is used as a first process fluid of the distillation column system, is introduced into the liquid tank, and is stored there.

Thus, not only the cold, but also the separation work performed on the first process fluid are stored in the liquid tank. This separation work can then be eliminated in the second operating mode by ensuring that the amount of air to be compressed in the main air compressor of the low-temperature air separation unit is correspondingly withdrawn. In comparison to the liquid buffering of feed air, the storage of liquid product oxygen is therefore considerably better.

The oxygen that is used as the first process fluid in this case can be removed directly in the distillation column system, for example from the low-pressure column or from a separate-standing condenser-container (for example, a secondary condenser); alternatively, the oxygen is drawn off in gaseous form from the distillation column system and then liquefied in the low-temperature air separation unit or a separate oxygen liquefier.

In many cases, it is advantageous, in the second operating mode, to use at least a portion of the compression heat generated in the main air compressor to heat the second process fluid upstream from the hot expansion turbine. This can be done in a way that is known in the art, either by indirect heat exchange between compressed feed air and second process fluid or double-indirectly by inserting a coolant circuit. This type of use of the compression heat can be combined with the use of another portion of the compression heat of the main air compressor for heating the feedwater for a steam power plant, as is described in the German Patent Application 10 2012 001 606 and the patent applications corresponding thereto (such as EP 12002470.8 and U.S. Ser. No. 13/750,015).

The system can also be expanded with a second or third liquid tank to form a removable storage system, as is known from, for example, Linde-Berichte aus Technik and Wissenschaft [Linde—Reports on Science and Technology], 54/1984, pages 18 to 20, EP 399197 B1=U.S. Pat. No. 5,084,081 or EP 842385 B1=U.S. Pat. No. 5,953,937. In this case, a third process fluid is stored as a cryogenic liquid at least for a time in a second liquid tank.

When in particular much cold is available, it can be useful to compress the nitrogen-enriched product stream between the draw-off from the high-pressure column and the heating to a high temperature in a cold compressor to a pressure that is higher than the operating pressure of the high-pressure column. "Cold compressor" is defined as a compressor whose inlet temperature is below the ambient temperature, in particular lower than 250 K. The inlet temperature of the cold compressor is preferably lower than 150 K, in particular lower than 100 K.

In addition, the invention also relates to a device for generating electrical energy having a combined system of a power plant and a low-temperature air separation unit, of the type described above, wherein the device further contains means for removing a nitrogen-enriched product stream from the high-pressure column as a second process fluid of the distillation column system and means for supplying the removed nitrogen-enriched product stream to a means for heating and to a hot expansion turbine during the second operating mode. In addition, the device can be provides with regulating means for automatic switching between the first operating mode and the second operating mode.

BRIEF DESCRIPTION OF THE DRAWINGS

The invention as well as additional details of the invention are explained in more detail below based on the embodiments shown in the drawings, wherein:

In FIG. 1, atmospheric air 1 is drawn in via filter 2 by a multi-stage main air compressor 30 (main air compressor—MAC) and fed to a coldbox 6, which has a main heat exchanger 83 and a distillation column system with a high-pressure column and a low-pressure column. Such main heat exchangers and distillation column systems are known in the art. See, for example, WO 2005/064252. High-pressure columns and low-pressure columns are in heat-exchanging connection via a main condenser, which is designed as a condenser-evaporator. The high-pressure column and low-pressure column can be separate columns or can be in the form of a double column as is known in the art. (As an alternative, more than two columns and/or one or more additional condenser-evaporators can also be used in the distillation column system.) Main air compressor 30 and coldbox 6 are part of a low-temperature air separation unit 7. Upstream from the coldbox 6, precooling and air purification are arranged as usual; the latter are not shown in the drawings.

Figure 1:
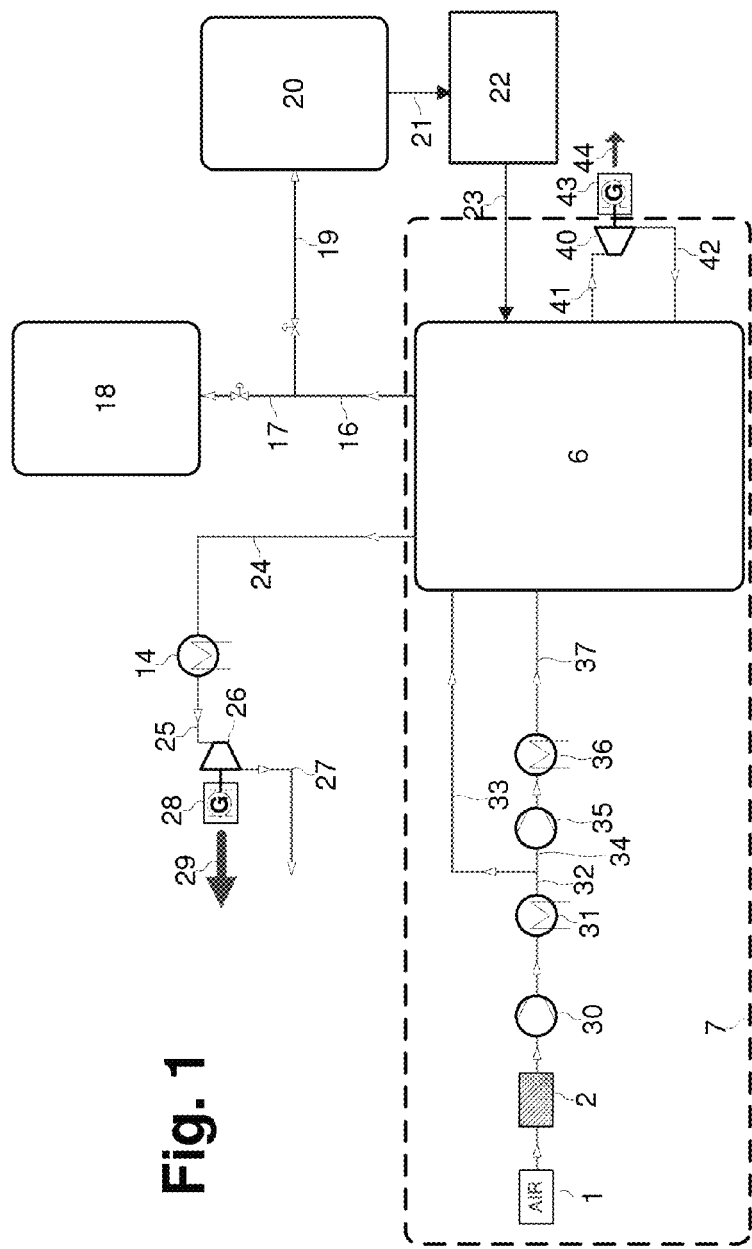
FIG. 1 shows a first embodiment of the invention with two air compressors and an external liquefier.

Downstream from the main air compressor 30, the air that is compressed to a first pressure is cooled in a secondary condenser 31 to approximately ambient temperature. A first partial stream 33 of the air enters into the coldbox 6 under this first pressure. A second partial stream 34 is further compressed to a second, higher pressure in a secondary compressor 35 (booster air compressor—BAC), cooled in secondary condenser 36 and directed into the coldbox 6 as high-pressure air 37. (The after-cooling 31, 36 is carried out by indirect heat exchange; as an alternative, the after-cooling step 36 can also be embodied by direct heat exchange in a direct contact condenser.)

Gaseous oxygen is drawn off from the low-pressure column of the low-temperature air separation unit, heated in the main heat exchanger, and removed from coldbox 6 via line 16. At least a first portion thereof is routed as a "first oxygen-enriched product stream" 17 to an oxyfuel power plant 18. As an alternative, the oxygen is internally compressed, i.e., drawn off in liquid form from the low-pressure column, evaporated or pseudo-evaporated in the main heat exchanger under elevated pressure, and then injected in gaseous form into the line 16 under this elevated pressure.

The line or conduit 17 is charged both in a first operating mode and in a second operating mode.

In addition, in a first operating mode, a second portion 19 of the oxygen product 16 as a "second oxygen-enriched product stream" and "first process fluid" flows into a separate oxygen liquefier 20. Liquid oxygen generated there is introduced as cryogenic liquid via line or conduit 21 into a liquid tank 22. (Little or preferably even no liquid flows through the line 23 from tank 22 to coldbox 6 in the first operating mode.)

The cold for oxygen liquefaction is generated here in the liquefier 20 itself. The latter contains a liquefaction circuit with one or two turbines (not shown in the drawings).

The cold necessary for the operation of the low-temperature air separation unit is generated in the first operating mode in a cold expansion turbine 40, in which a "third process fluid of the distillation column system" is actively depressurized, which is formed by a nitrogen-enriched product stream 41 from the high-pressure column, preferably by gaseous nitrogen from the head of the high-pressure column. The actively depressurized nitrogen 42 is heated in the main heat exchanger. The cold expansion turbine 40 can be braked by any known brake assembly; in the example, it is coupled to a generator 43 that generates additional electrical energy 44.

In the second operating mode, the supply 19/21 to tank 22 is reduced or completely turned off. Instead, liquid oxygen is removed from the liquid tank 22, so that the liquid level drops in tank 22. The stored cryogenic liquid from the liquid tank 22 is introduced via line 23 into the distillation column system, in particular into the low-pressure column, in the evaporation space of a condenser-evaporator, in particular the main condenser and/or a secondary condenser, and/or in the main heat exchanger.

By the liquid injection via line 23, the throughput through the cold turbine 40 can be reduced, optionally to zero. The amount of air through the main air compressor 30 can be reduced with a uniform or even elevated delivery of oxygen 17 to the power plant 18. The energy consumption of the low-temperature air separation unit thus drops in the second operating mode.

At the same time, nitrogen from the high-pressure column is removed as a "nitrogen-enriched product stream," heated in the main heat exchanger, and drawn off as a "second process fluid of the distillation column system" via line 24 from the low-temperature air separation unit, heated in a nitrogen heater 14 (e.g., an indirect heat exchanger) to a high temperature of, for example, 75° C., and then fed into a hot expansion turbine 26 via line 25 in the active depressurization stage. The actively depressurized nitrogen 27 is blown off into the atmosphere, used in an evaporative condenser as a dry gas, or used as regenerating gas in an adsorption system for air purification.

The hot expansion turbine 26 is coupled mechanically to a generator 28, which converts the mechanical energy generated in the expansion turbine into electrical energy 29.

In the first operating mode (for example, during nighttime), more oxygen is produced than is consumed by the power plant. This "excess" oxygen 19 is liquefied in the external oxygen liquefier 20 (or alternatively in an oxygen liquefier that is integrated in the low-temperature air separation unit—see FIGS. 6 and 7) and stored in the cryogenic liquid tank 22. In the second operating mode (for example during the day), the stored LOX (liquid oxygen) 23 is injected into the air separation unit 7 in order to reduce the energy demand thereof. In this case, the operation of the air separation unit is carried out in the "LOX-injection" mode (analogously to the known term "LIN injection" (LIN=liquid nitrogen)) with turbines 40 that are turned off for cold production.

In addition to reducing a portion of the separation efficiency in the oxygen production, a large portion of the liquefaction energy that is used can also be recovered.

The production of oxygen costs energy and thus impairs the overall efficiency of the power plant. Very high efficiency is therefore required by the air separation unit. The energy-optimized methods for the production of impure oxygen have at least two air pressure levels. For generating cold in the mode without LOX injection, the pressurized nitrogen from the high-pressure column with the lowest pressure can also be used if a method with several high-pressure columns operated at varying pressure is used (see, for example, WO 2009/095188 A2=US 2011/0023540 A1 or German Patent Application 10 2011 113671 and patent applications corresponding thereto). Because of the low pressure, this amount is quite large and in the optimal case is approximately 25-30 mol % of the entire amount of air at the intake in the coldbox 6.

Since, in the LOX injection mode (second operating mode), no cold production is necessary, the cold turbine 40 is turned off, and the pressurized nitrogen instead is depressurized in the hot turbine for generating energy. The additional heating 14 of this pressure-GAN stream 24 (GAN=gaseous nitrogen) before the intake into the turbine 26 increases the turbine output (energy recovery) and in this case allows the temperature to be set at the turbine outlet close to ambient temperature (e.g., in the case of use of the turbine stream as a regenerating gas for an adsorption system).

Figure 2:
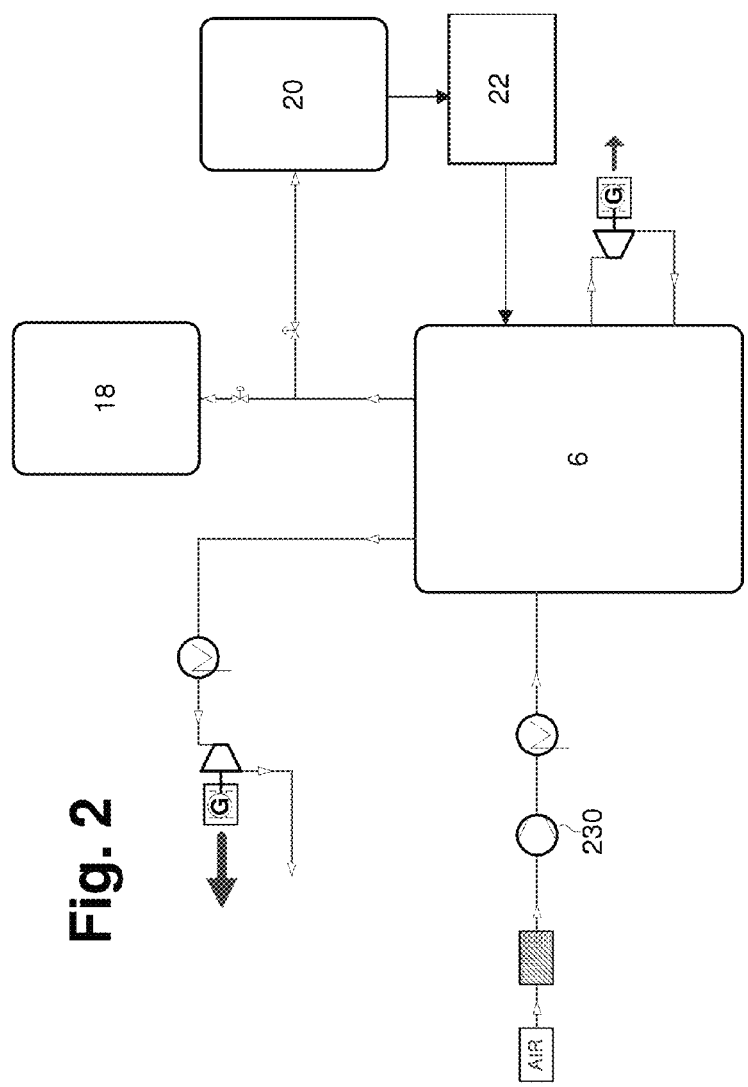
FIG. 2 shows a second embodiment of the invention with a single air compressor.

FIG. 2 is distinguished from FIG. 1 in that all of the air in a multi-stage main air compressor 230 is compressed with intermediate cooling to a uniform pressure level.

Figure 3:
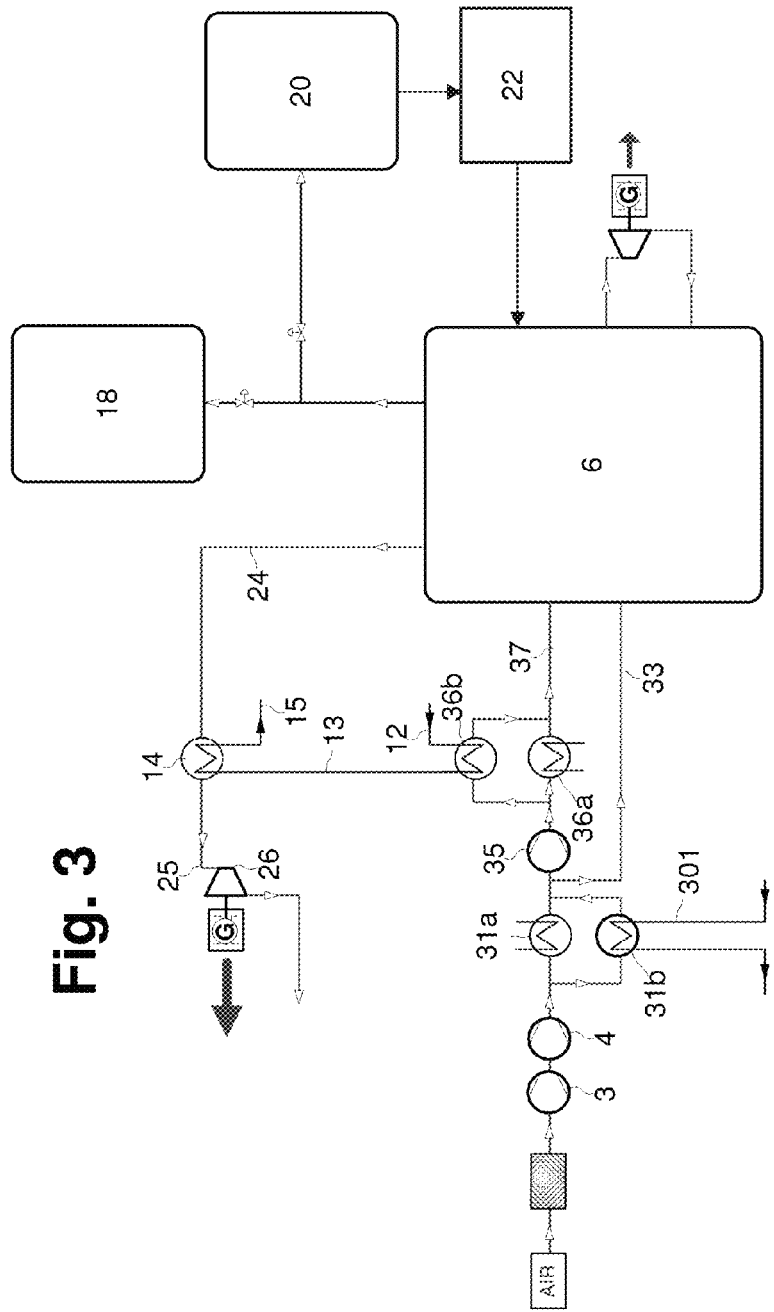
FIG. 3 shows a third embodiment of the invention with internal heat integration by using compression heat of the main air compressor for heating the second process fluid, FIG. 4 and FIG. 5 each show another embodiment with internal heat integration.

In FIG. 3, the compression heat of the main air compressor 3, 4, which has two stages without intermediate cooling, and the compression heat of the secondary compressor 35 are used for generating energy.

In this case, in the first operating mode, the secondary condensers 31a and 36b conventionality operated with cooling water are in operation (as in FIG. 1). The after-cooling is carried out by indirect heat exchange; alternatively, the after-cooling step 36a can also be embodied by direct heat exchange in a direct contact condenser.

In the second operating mode, however, feedwater 301 for the steam circuit of the power plant is heated in a secondary condenser 31b, as is described in detail in the German Patent Application 10 2012 001 606 and the patent applications corresponding thereto. (Instead of feedwater, another coolant fluid can also be introduced via line 301 into the secondary condenser 31b, which couples heat in the power plant 18 downstream from the secondary condenser, for example by indirect heat exchange with feedwater.) At the same time, the compression heat of the secondary compressor 35 is transferred a secondary condenser 36b by indirect heat exchange to cooling water 12, which comes, for example, from a cooling tower. The heated cooling water 13 releases heat into the nitrogen heater 14 by indirect heat exchange and is ultimately routed via line 15 again to the cooling tower. Thus, a heating temperature in the range of approximately 50 to 90° C. can be reached in line 25.

The variant with "internal heat integration," i.e., the heating of the pressure-GAN-stream 24 before entry into the turbines 26 with compressor waste heat, results in reducing the energy loss in the compressor and improves the overall efficiency of the solution.

Figure 4:
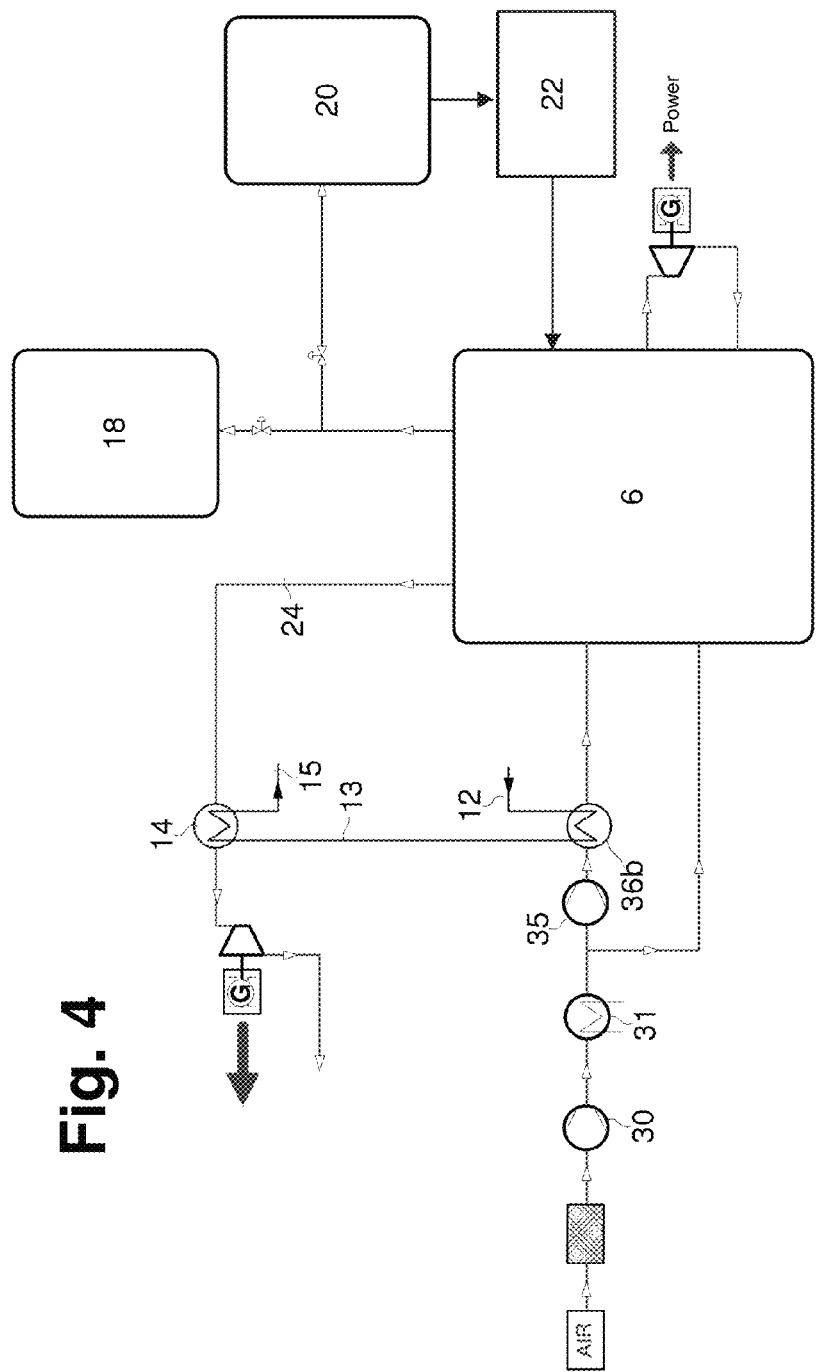

The compression heat of the secondary compressor 35, however, can also be used without being switched between different secondary condensers. A corresponding embodiment of the invention is shown in FIG. 4. The cooling of the main air compressor 30 is cooled here conventionally in a cooling-water-operated secondary condenser 31, optionally supplemented by one or more intermediate condensers. If the main air compressor 30 is embodied as an axial compressor, no intermediate condenser is used. This solution also operates without being bound at all to the power plant.

In the first operating mode, the hot water stream 13 is run to the heater 14, not as shown in the drawing but rather directed into a cooling tower, in which the heat is drained off; the introduction into the cooling tower can be carried out directly or after mixing with water from the outlet of the secondary condenser 31. As an alternative, a secondary condenser or a direct contact condenser that are connected in parallel can be provided analogously to FIG. 3 for the first operating mode.

Figure 5:
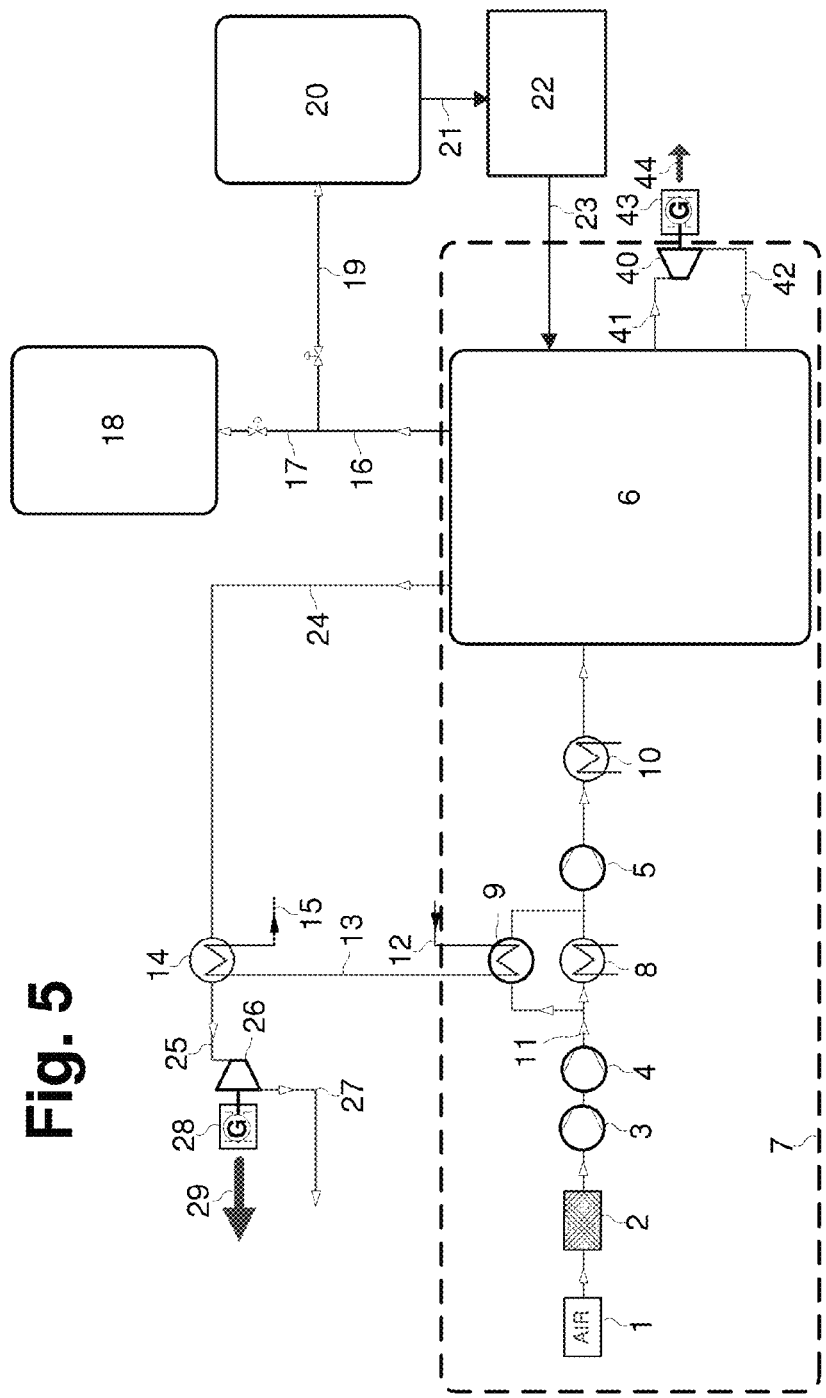

In FIG. 5, a three-stage main air compressor 3, 4, 5 is used, which brings all of the air to a uniform pressure. Similar to FIG. 3, no intermediate cooling is used between the first two stages 3, 4. The air 11 downstream from the second compressor stage 4 thus has a relatively high temperature. Thus, in the second operating mode in the condenser 9, cooling water 12, which, for example, comes from a cooling tower, is heated by indirect heat exchange. The heated cooling water 13 again releases heat in the nitrogen heater 14 by indirect heat exchange, and ultimately is routed again to the cooling tower via line 15. The third compressor stage 5 is conventionally cooled in a secondary condenser 10.

During the first operating mode, the air 11 after the second compressor stage is also directed to a conventional condenser 8.

The amount 24 of pressurized nitrogen that is to be depressurized is smaller than the amount of feed air 11, and only a portion of the air is directed through the secondary condenser 9 in the second operating mode; the residual air is cooled in conventional secondary condenser 8 that is connected in parallel on the air side. During night operation, all of the feed air is cooled in the secondary condenser 8. This embodiment is important for the usual processes with a single air pressure. In such processes, the pressure in the high-pressure column (PGAN pressure) (PAGN=gaseous nitrogen under pressure) is correspondingly high; therefore, a much higher "heating temperature" is required here.

Figure 6:
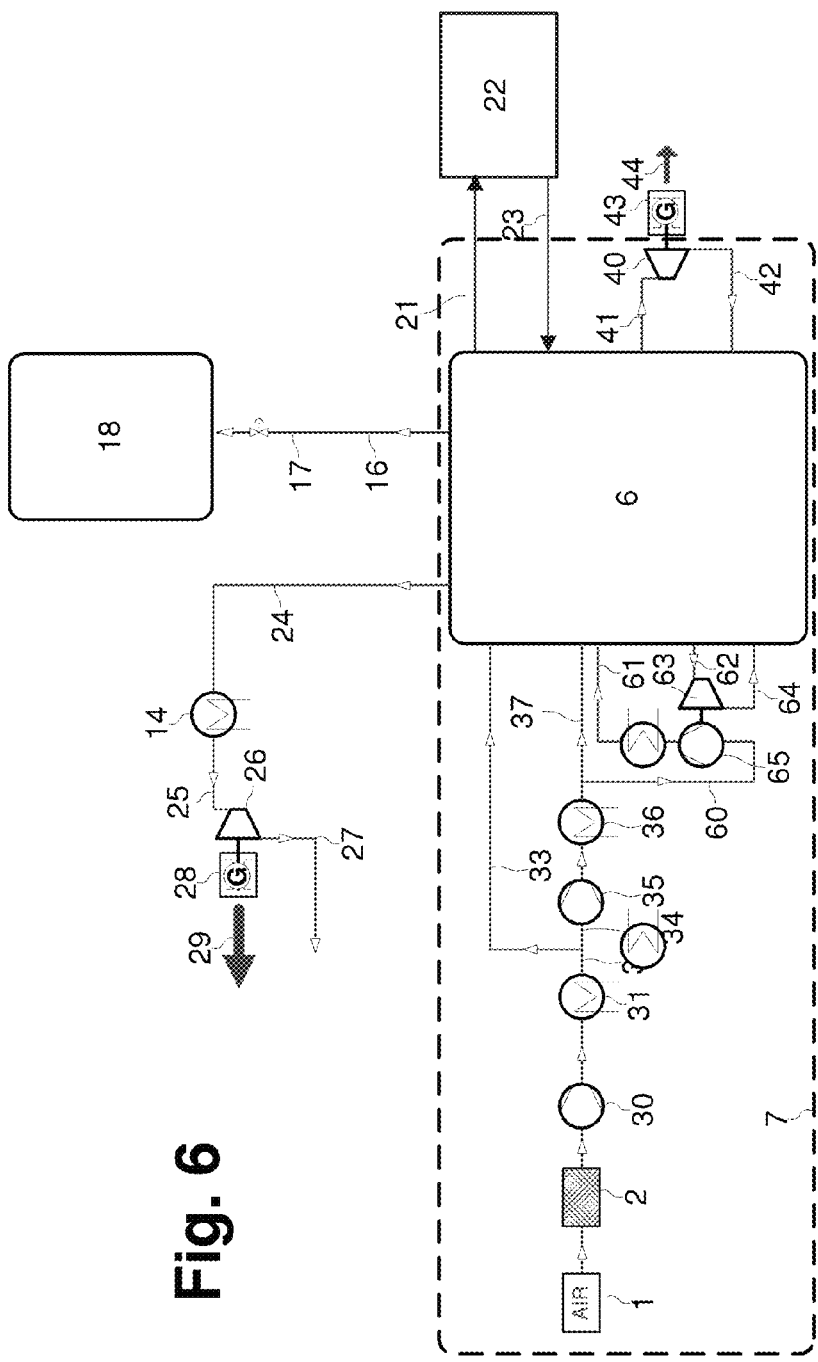
FIGS. 6 and 7 show two variations on FIG. 1 without an external liquefier and with cold generation by active depressurization of feed air.
Figure 7:
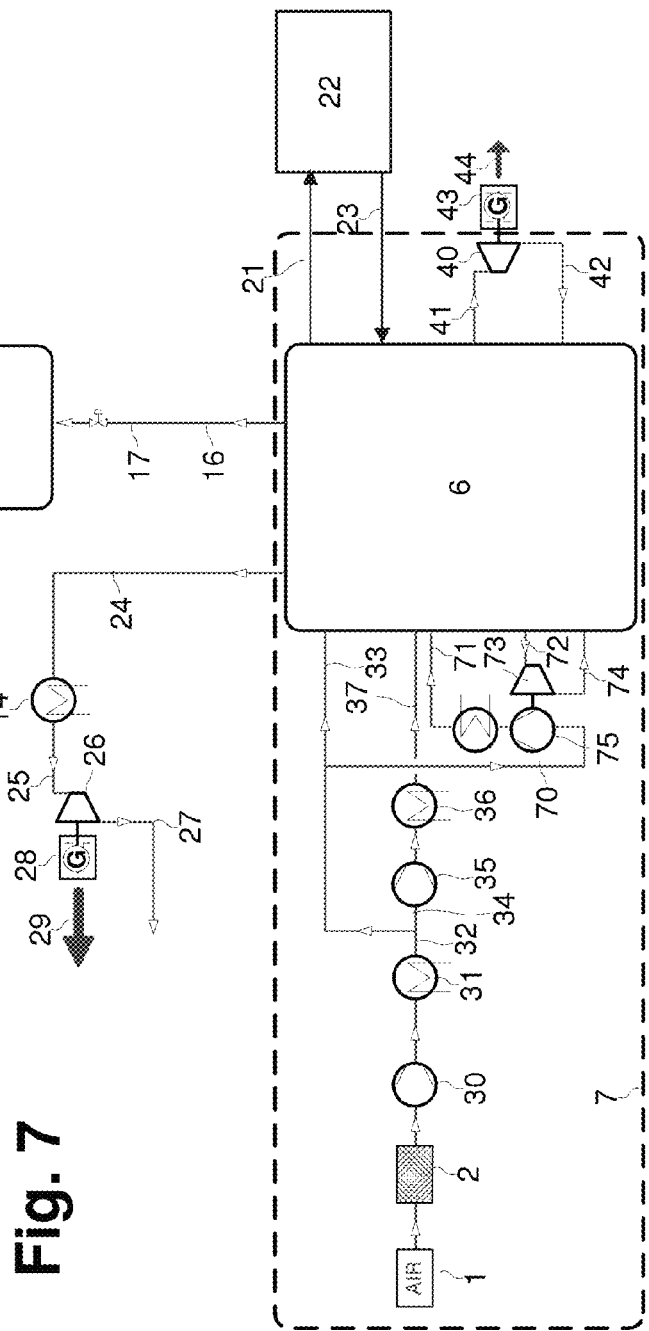

FIGS. 6 and 7 correspond to FIG. 1 to a large extent. However, deviating from FIG. 1, no external oxygen liquefier is used, but rather the "first process fluid" is itself liquefied in the low-temperature air separation unit. The cold required for this purpose is generated by active depressurization of a portion of the feed air.

In FIG. 6, during the first operating mode, a portion of the high-pressure air is branched off downstream from the secondary compressor 35 or its secondary condenser 36 as a turbine air stream 60, 61, cooled in the main heat exchanger of the coldbox 6 to an intermediate temperature, removed again via line 62, and actively depressurized in an air turbine 63. The actively depressurized air 64 is introduced into the distillation column system of coldbox 6, in particular into the low-pressure column of coldbox 6. Upstream from the introduction into the main heat exchanger, the turbine air stream 60 is further compressed in a secondary compressor 65, which is driven by the turbine 63; turbine 63 and secondary compressor 65 are directly mechanically coupled and preferably have a common shaft. Using the additional cold that is generated, liquid oxygen 21 which is generated within distillation column system of coldbox 6 can be drawn off in liquid form as "first process fluid" from the distillation column system and introduced as "cryogenic liquid" into the oxygen tank 22.

The turbine air stream 70, 71 in FIG. 7, however, is branched off to the lower pressure level of the first partial stream 33, i.e., downstream from the main air compressor 30 or its secondary condenser 36. Analogously to FIG. 6, the turbine air stream 70, 71 is cooled in the main heat exchanger of the coldbox 6 to an intermediate temperature, removed again via line 72, and actively depressurized in an air turbine 73. The actively depressurized air 74 is routed into the distillation column system of coldbox 6, in particular the low-pressure column. Upstream from the introduction into the main heat exchanger, the turbine air 70 is further compressed in a secondary compressor 75, which is driven by the turbine 73; turbine 73 and secondary compressor 75 are directly mechanically coupled and preferably have a common shaft.

The air turbine 63, 73 is operated in the method of FIGS. 6 and 7 in particular during the first operating mode—instead of the oxygen liquefier 20 of FIG. 1—to generate the cold for forming the cryogenic liquid. During the second operating mode, the throughput through the air turbine 63, 73 is reduced, or the air turbine is completely turned off.

Figure 8:
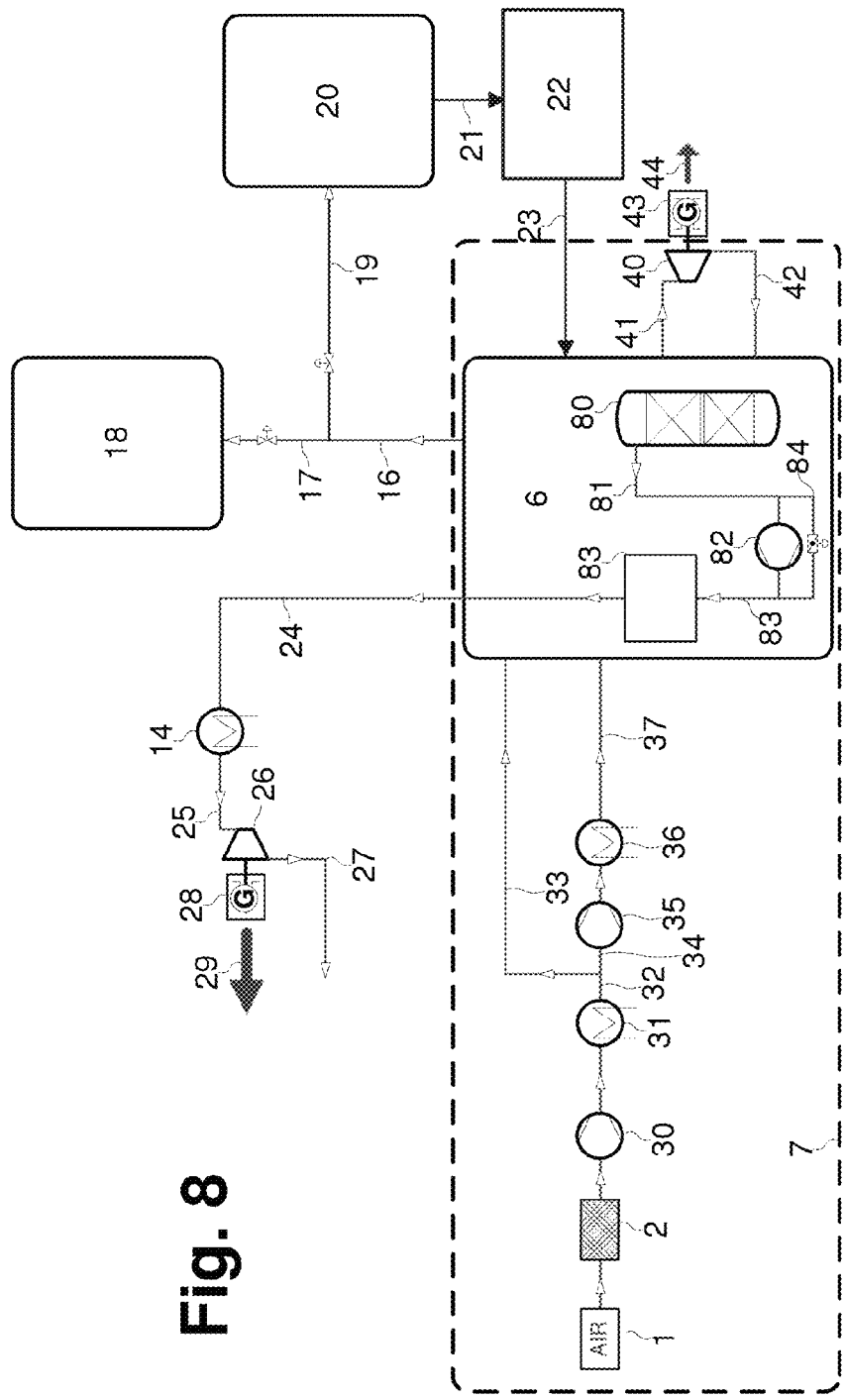
FIG. 8 shows a variation on FIG. 1 with a cold compressor.

FIG. 8 largely corresponds to FIG. 1. In addition, however, during the second operating mode, a cold compressor 82 is used, in which the nitrogen 81 from the high-pressure column 80 (the "second process fluid") is further compressed from the operating pressure of the high-pressure column, for example, from an operating pressure at the head of the high-pressure column of 2.7 bar to an end pressure of 4.7 bar (or else higher). The nitrogen 81 enters below the temperature of the high-pressure column into the cold compressor 82 and is introduced into the latter at an intermediate temperature of the main heat exchanger and heated to approximately ambient temperature. Then, nitrogen flows as in FIG. 1 via line 24 to the nitrogen heater 14 and in addition via line 25 to the hot expansion turbine 26. With this variant, the pressure ratio to the expansion turbine 26 can be increased and thus in the second operating mode, more electrical energy 29 can be generated. In the first operating mode, the expansion turbine 26 stops, and more liquid oxygen must be generated and stored than in the case of FIG. 1, i.e., more than the operation of the low-temperature air separation unit (without cold compressor) requires in the second operating mode.

In addition, a bypass line 84 is provided around the cold compressor 82, with which the system can be run in a third operating mode, which corresponds to the second operating mode of FIG. 1. Somewhat less energy is thus generated than in this second operating mode (of FIG. 8).

This can be used, for example, to cover consumption peaks during daily operation ("peak shaving"); in normal daily operation, the system is then run in the third operating mode (bypass 84 around the cold compressor 82) and in this case generates considerably more energy than in the first operating mode. In the case of spikes in usage, which occur during the day, in addition the cold compressor 82 is used, and thus in the second operating mode, still more energy than in the third operating mode is generated.

Figure 9:
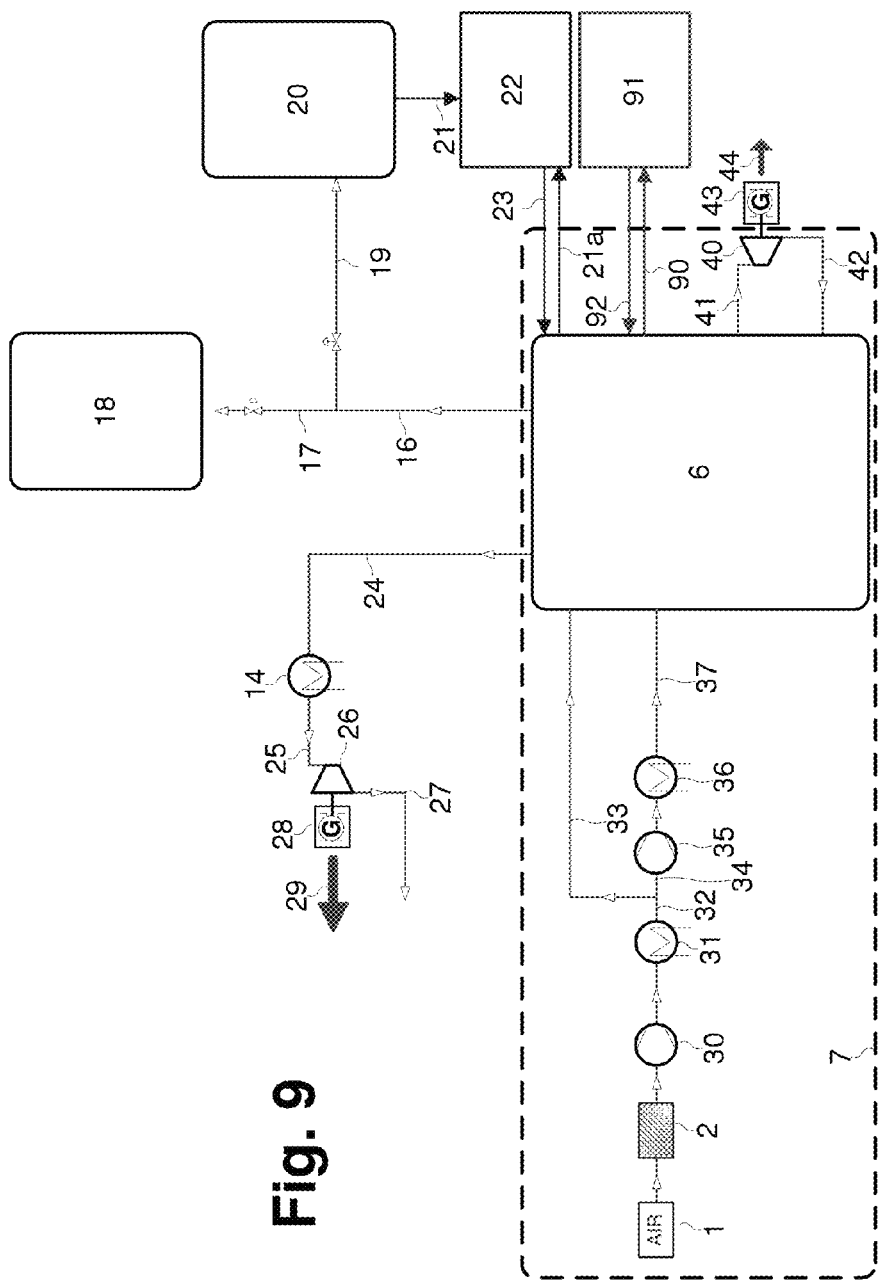
FIG. 9 shows another variation on FIG. 1 with an alternating storage device with two liquid tanks.

In FIG. 9, the system of FIG. 1 is expanded to form an alternating storage unit. To this end, a "third process fluid" 90 is stored as a cryogenic liquid at least for a time in a second liquid tank 91. As a third process fluid, nitrogen from the high-pressure column is used here. The latter is liquefied in the main condenser of the low-temperature air separation unit, not shown, and introduced via line 90 in the form of cryogenic liquid into the second liquid tank 91, which is designed as a nitrogen tank. During the second operating mode (for example in daily operation), stored liquid oxygen is injected via line 23 into the low-temperature air separation unit, and liquid nitrogen 90 is run into the tank. At this time, the oxygen tank 22 is virtually emptied, and the nitrogen tank is filled. In the first operating mode (for example during night operation), the nitrogen tank is emptied (liquid nitrogen via line 92 is injected into the low-temperature air separation unit) and the oxygen tank is filled (liquid oxygen via line 21*a* from the low-temperature air separation unit together with the externally liquefied oxygen via line 21). Thus, in the second operating mode, additional energy can be recovered. In addition, the transition between first and second operating modes and back can be configured less strictly.

The variants of FIGS. 6 to 9 in comparison to FIG. 1 are applicable analogously to the embodiments of the invention according to FIGS. 2 to 5. In addition, the variants of FIGS. 6 and 9 can also be combined with one another.

In a variant of the embodiments according to FIGS. 1 to 9, the cold turbine 40 is omitted. In this case, all of the process cold for the low-temperature air separation unit is generated in the external liquefier 20. In this case, liquid generated in the liquefier is directed into the distillation column system, even in the first operating mode. In the second operating mode, the liquefier 20 runs at reduced throughput or is completely turned off. This method variant is used in particular when the operating mode is alternated in a regular day-night cycle.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application DE 10 2012 006 746.1, filed Apr. 3, 2012, are incorporated by reference herein.

The invention claimed is:

1. A method for generating electrical energy in a combined system that comprises a power plant (18) and a cryogenic air separation unit (7), said method comprising:

In the cryogenic air separation unit (7), compressing an air feed stream (1) in a main air compressor (3, 4, 5; 30), cooling said air feed stream (1) in a main heat exchanger, and introducing said air feed stream into a distillation column system comprising a high-pressure column and a low-pressure column, wherein pressures within said high-pressure column are higher than any pressures within the low-pressure column, and introducing a first oxygen-enriched product stream (17) from said distillation column system into said power plant (18), wherein in a first operating mode:
a cryogenic liquid (21, 21*a*), formed by a first process fluid (16, 19) from said distillation column system, is introduced into a liquid tank (22) and is stored there at least in part, and wherein in a second operating mode:
the cryogenic liquid (23) is removed from said liquid tank (22) and introduced into said distillation column system,
a second process fluid (24), which is a nitrogen-enriched product stream removed from said high pressure column, is heated to a high temperature (14), prior to any active depressurization thereof, and then actively depressurized in a hot expansion turbine (26), wherein the temperature at an inlet of said hot expansion turbine is above ambient temperature, mechanical energy generated in said hot expansion turbine (26) is converted (28) at least partially into electrical energy (29).

2. The method according to claim 1, wherein said second process fluid (24) is not compressed between said high-pressure column and said hot expansion turbine (26).

3. The method according to claim 2, wherein in said first operating mode, a third process fluid (41) of said distillation column system-4s formed by a nitrogen-enriched product stream from said high-pressure column, is actively depressurized in a cold expansion turbine (40), and the actively depressurized third process fluid (42) is heated in said main heat exchanger.

4. The method according to claim 3, wherein said cold expansion turbine has an outlet and Ma a temperature of the actively depressurized third process fluid (42) at said outlet of said cold expansion turbine is lower than 200K.

5. The method according to claim 1, wherein in said first operating mode, a third process fluid (41) of said distillation column system formed by a nitrogen-enriched product stream from said high-pressure column, is actively depressurized in a cold expansion turbine (40), and the actively depressurized third process fluid (42) is heated in said main heat exchanger.

6. The method according to claim 5, wherein said cold expansion turbine has an outlet and a temperature of the actively depressurized third process fluid (42) at said outlet of said cold expansion turbine is lower than 200K.

7. The method according to claim 1, wherein in said first operating mode, a second oxygen-enriched product stream from said distillation column system is used as said first process fluid (19, 21, 21*a*) of said distillation column system, is introduced into the liquid tank (22), and is stored there.

8. The method according to claim 1, wherein in said second operating mode, at least one portion of compression heat generated in the main air compressor (3, 4, 5; 30) or in a secondary compressor (35) for air is used for heating (14) said second process fluid (24) upstream of said hot expansion turbine (26).

9. The method according to claim 8, wherein, in said second operating mode, at least one portion of compression heat generated in said main air compressor (3, 4, 5; 30) is used for heating (14) said second process fluid (24) upstream of said hot expansion turbine (26).

10. The method according to claim 1, wherein a third process fluid is stored as a cryogenic liquid at least for a time in a second liquid tank.

11. The method according to claim 1, wherein said nitrogen-enriched product stream (81), between removal from said high-pressure column (80) and said heating (14) to the high temperature, is compressed in a cold compressor (82) to a pressure that is higher than an operating pressure of the high-pressure column (80), wherein an inlet temperature of said cold compressor (82) is below ambient temperature.

12. The method according to claim 11, wherein the inlet temperature of the cold compressor is less than 150 K.

13. The method according to claim 11, wherein the inlet temperature of the cold compressor is less than 100 K.

14. The method according to claim 11, wherein the inlet temperature of the cold compressor is less than 250 K.

15. The method according to claim 1, wherein said main air compressor is a multi-stage air compressor (30).

16. The method according to claim 1, wherein, after being compressed in said main air compressor, said air feed stream (1) is cooled in a condenser (31) and then divided into a first partial stream (33) and a second partial stream (34), said first partial stream is fed to said distillation column system, and said second partial stream is further compressed to a higher pressure in a secondary compressor (35), cooled in secondary condenser (36) and fed to said distillation column system.

17. The method according to claim 16, wherein said main air compressor is a multi-stage main air compressor which has two stages without intermediate cooling.

18. The method according to claim 16, wherein, in said second operating mode, at least one portion of compression heat generated in said secondary compressor (35) and removed by said secondary condenser (36) is used for heating (14) said second process fluid (24) upstream of said hot expansion turbine (26).

19. The method according to claim 16, wherein a portion of said second partial stream compressed to a higher pressure is further compressed in a further secondary compressor (65), cooled in said main heat exchanger, and introduced into said distillation column system.

20. The method according to claim 1, further comprising depressurizing a further nitrogen-enriched product stream (41) from said high-pressure column, and then heating the further nitrogen-enriched product stream (42) in said main heat exchanger.

21. The method according to claim 1, wherein all of said air feed stream (1) is compressed in a multi-stage main air compressor (230), with intermediate cooling, to a uniform pressure level before being fed to said distillation column system.

22. The method according to claim 1, wherein the temperature at the inlet of said hot expansion turbine is at least 40° C.

23. The method according to claim 1, wherein the temperature at the inlet of said hot expansion turbine is at least 45° C.

24. A device for generating electrical energy comprising:
a combined system comprising a power plant (18) and a cryogenic air separation unit (7), said cryogenic air separation unit (7) comprising a main air compressor (3, 4, 5; 30) for compressing an air feed stream (1), a main heat exchanger for cooling a compressed air feed stream, a distillation column system comprising a high-pressure column and a low-pressure column, wherein pressures within said high-pressure column are higher than any pressures within the low-pressure column, and means for introducing a cooled air feed stream into said distillation column system,
means for introducing a first oxygen-enriched product stream (17) from said distillation column system into said power plant (18),
means for introducing a cryogenic liquid (21, 21*a*), which is formed by a first process fluid (16, 19) of the distillation column system, into a liquid tank (22) during a first operating mode,
means for removing the cryogenic liquid (23) from said liquid tank (22) and introducing the cryogenic liquid into said distillation column system during a second operating mode,
means for heating (14) a second process fluid (24) of said distillation column system to a high temperature prior to any active depressurization thereof, wherein said second process fluid (24) is a nitrogen-enriched product stream removed from said high pressure column, a hot expansion turbine (26) for active depressurization of heated second process fluid during the second operating mode, means for converting (28) mechanical energy generated in said hot expansion turbine (26) into electrical energy (29) during the second operating mode, means for removing the nitrogen-enriched product stream from the high-pressure column as the second process fluid (24) of said distillation column system and means for supplying the nitrogen-enriched product stream to said means for heating (14) and to said hot expansion turbine (26) during the second operating mode.

25. The device according to claim 24, further comprising regulating means for automatic switching between the first operating mode and the second operating mode.

26. A device for generating electrical energy comprising:
a combined system comprising a power plant (18) and a cryogenic air separation unit (7), said cryogenic air separation unit (7) comprising a main air compressor (3, 4, 5; 30) for compressing an air feed stream (1), a main heat exchanger for cooling a compressed air feed stream, a distillation column system comprising a high-pressure column and a low-pressure column, wherein pressures within said high-pressure column are higher than any pressures within the low-pressure column, and means for introducing a cooled air feed stream into said distillation column system, a line for introducing a first oxygen-enriched product stream (17) from said distillation column system into said power plant (18), a line for introducing a cryogenic liquid (21, 21a), which is formed by a first process fluid (16, 19) of the distillation column system, into a liquid tank (22) during a first operating mode, a line for removing the cryogenic liquid (23) from said liquid tank (22) and introducing the cryogenic liquid into said distillation column system during a second operating mode, a nitrogen heater (14) for heating a second process fluid (24) of said distillation column system to a high temperature, prior to any active depressurization thereof, wherein said second process fluid (24) is a nitrogen-enriched product stream removed from said high pressure column, a hot expansion turbine (26) for active depressurization of heated second process fluid during the second operating mode, a generator for converting (28) mechanical energy generated in said hot expansion turbine (26) into electrical energy (29) during the second operating mode, a line for removing the nitrogen-enriched product stream from the high-pressure column as the second process fluid (24) of said distillation column system and a line for supplying the nitrogen-enriched product stream to said nitrogen heater (14) and to said hot expansion turbine (26) during the second operating mode.

* * * * *